H. KELLY & D. COLE.
FRUIT-DRIER.

No. 190,685.　　　　　　　　Patented May 15, 1877.

WITNESSES　　　　　　　　INVENTORS

Henry Hall Northup　　　　Hampton Kelly

Thomas Nelson Strong　　　David Cole

UNITED STATES PATENT OFFICE.

HAMPTON KELLY AND DAVID COLE, OF EAST PORTLAND, OREGON.

IMPROVEMENT IN FRUIT-DRIERS.

Specification forming part of Letters Patent No. 190,685, dated May 15, 1877; application filed March 27, 1877.

*To all whom it may concern:*

Figure 1:
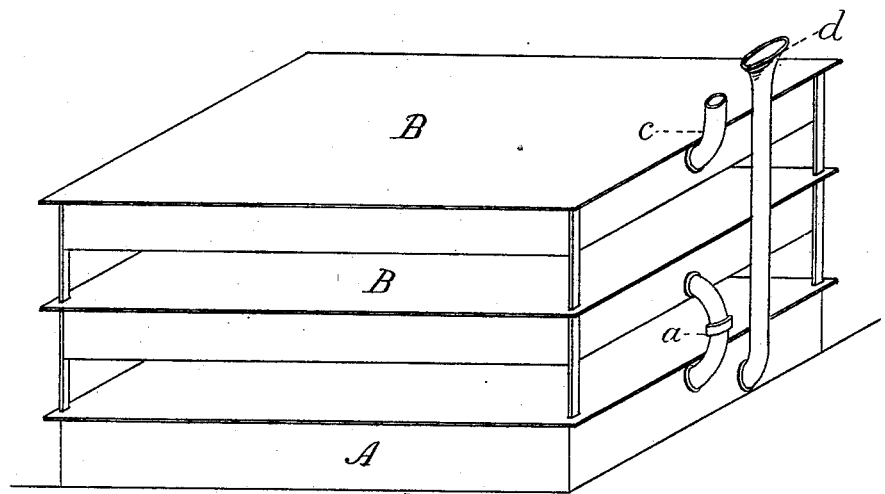
Figure 2:
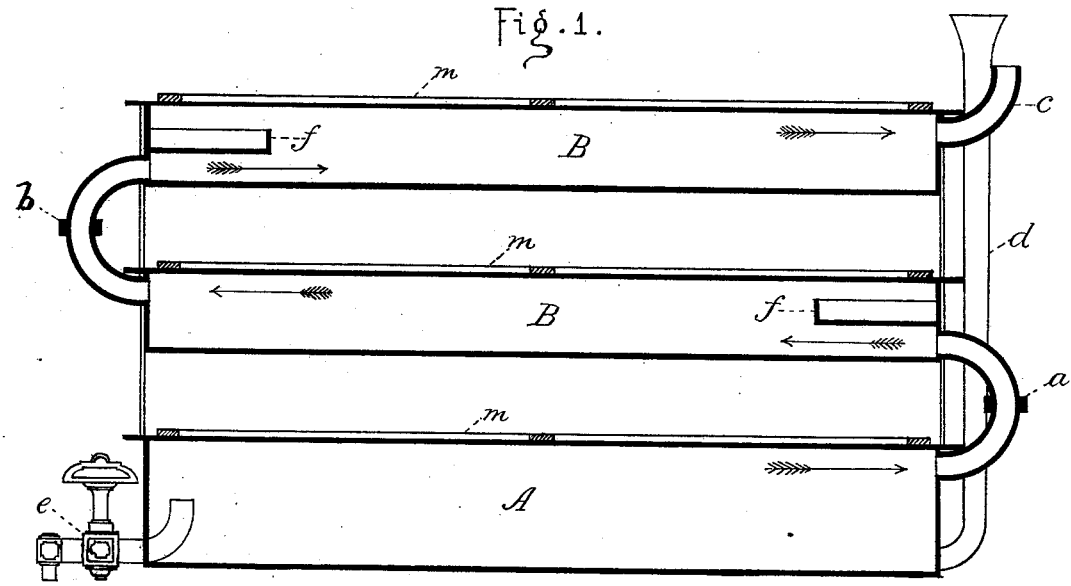

Be it known that we, HAMPTON KELLY and DAVID COLE, of East Portland, county of Multnomah, and State of Oregon, have invented an Improved Fruit-Drying Machine, of which the following is a specification:

The object of our invention is to rapidly dry apples, pears, potatoes, and all other fruits and vegetables capable of being dried, by the combination, in a fruit and vegetable drying machine, of the steam-boiler A with the hollow metal shelves B B, surmounting and connected with the boiler by the steam-pipes $a$ and $b$, as shown in Figures 1 and 2 of the accompanying drawing.

The machine is illustrated more in detail in the side section, Fig. 2.

The boiler A is filled with water by means of the feed-pipe $d$, and the machine set upon a stove or range. As the water becomes heated the steam passes out of the boiler, through the steam-pipe $a$, into the first metal box or shelf B, in the interior of which it distributes itself equally, and then passes on, through the steam-pipe $b$, into the box next above. Inside each of these boxes, immediately above where the steam-pipe from the box or boiler below opens into it, is placed a shallow pan, $f\!f$. These pans are from two to four inches square, and from one-quarter to one-half of an inch in depth, and are so constructed that the steam, after passing under them, has free access to all parts of the inside upper surface of the boxes. Being kept full of water by the condensation of steam, they prevent the burning of the fruit at the point immediately above where the steam enters.

The fruit to be dried, being first properly prepared, is placed on light movable frames, the edges of which are represented in Fig. 2 by the reference-letters $m\,m\,m$, made to fit the shelves; and one of these frames, with its fruit, is placed on the boiler, and on each box or shelf of the drier. The fruit is rapidly and effectually dried by the heat radiated from the thin metal boxes above and below it.

The lower sides of the boxes have a slight inclination toward the entering-steam pipe, thus enabling the waste-water caused by condensation to return to the boiler.

The course of the steam while traversing the boxes and steam-pipes is shown by the arrows in Fig. 2. $c$ represents the escape-pipe, and $e$ the cock by which the height of the water in the boiler is ascertained.

It is evident that the machine may be of any desired shape or size, have as many boxes or shelves as may be advisable, and be heated by steam from any ordinary boiler.

We claim as our invention—

The combination, in a fruit and vegetable drying machine, substantially as described, of a succession of flat hollow boxes of thin metal, one above another, with a boiler, steam and feed pipes, and pans to prevent burning.

HAMPTON KELLY.
DAVID COLE.

Witnesses:
HENRY HALL NORTHUP,
THOMAS NELSON STRONG.